(12) United States Patent
Chen et al.

(10) Patent No.: US 8,351,201 B2
(45) Date of Patent: Jan. 8, 2013

(54) LATCHING MECHANISM AND ELECTRONIC DEVICE USING THE SAME

(75) Inventors: Rui-Hao Chen, Shenzhen (CN); Yue-Wu Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 280 days.

(21) Appl. No.: 12/944,860

(22) Filed: Nov. 12, 2010

(65) Prior Publication Data

US 2012/0050963 A1 Mar. 1, 2012

(30) Foreign Application Priority Data

Aug. 24, 2010 (CN) .......................... 2010 1 0261443

(51) Int. Cl.
*H05K 5/00* (2006.01)
*H05K 7/00* (2006.01)

(52) U.S. Cl. ......... 361/679.56; 361/679.57; 361/679.58; 361/679.3; 455/575.1

(58) Field of Classification Search ............... 361/679.3, 361/679.56, 679.57, 679.58; 455/575.1
See application file for complete search history.

(56) References Cited

FOREIGN PATENT DOCUMENTS

| | | |
|---|---|---|
| CN | 2777908 Y | 5/2006 |
| CN | 101127390 A | 2/2008 |
| CN | 101635340 A | 1/2010 |

*Primary Examiner* — Anthony Haughton
(74) *Attorney, Agent, or Firm* — Altis Law Group, Inc.

(57) ABSTRACT

A latching mechanism for a portable electronic device includes a housing, a pressing assembly, a latching assembly and a cover, the cover latches in the housing with the latching assembly, the pressing assembly is pushed along a first direction, causing the latching assembly to slide along a second direction perpendicularly to detach the cover from the housing.

16 Claims, 5 Drawing Sheets

LATCHING MECHANISM AND ELECTRONIC DEVICE USING THE SAME

BACKGROUND

1. Technical Field

The disclosure relates to latching mechanisms and electronic devices; and particularly to a latching mechanism for latching a cover to a housing of an electronic device.

2. Description of Related Art

Portable electronic devices such as mobile phones are widely used. When a battery is installed in the portable electronic device, the battery may be shielded and fixed in place by a cover. The cover is latched to the housing of the portable electronic device.

One typical cover assembly includes a pin at one end and a protrusion at an opposite end. The housing defines a receiving hole and a holding space. The protrusion can be received in the holding space, and then the cover is pushed facing the housing until the pin is received in the receiving hole. As such, the cover is secured to the housing and the protrusion is held in the holding space. However, separating the cover from the housing requires the removal of the pin from the receiving hole by using a large external force.

Therefore, there is room for improvement within the art.

BRIEF DESCRIPTION OF THE DRAWINGS

Many aspects of the present latching mechanism and electronic device using the same can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
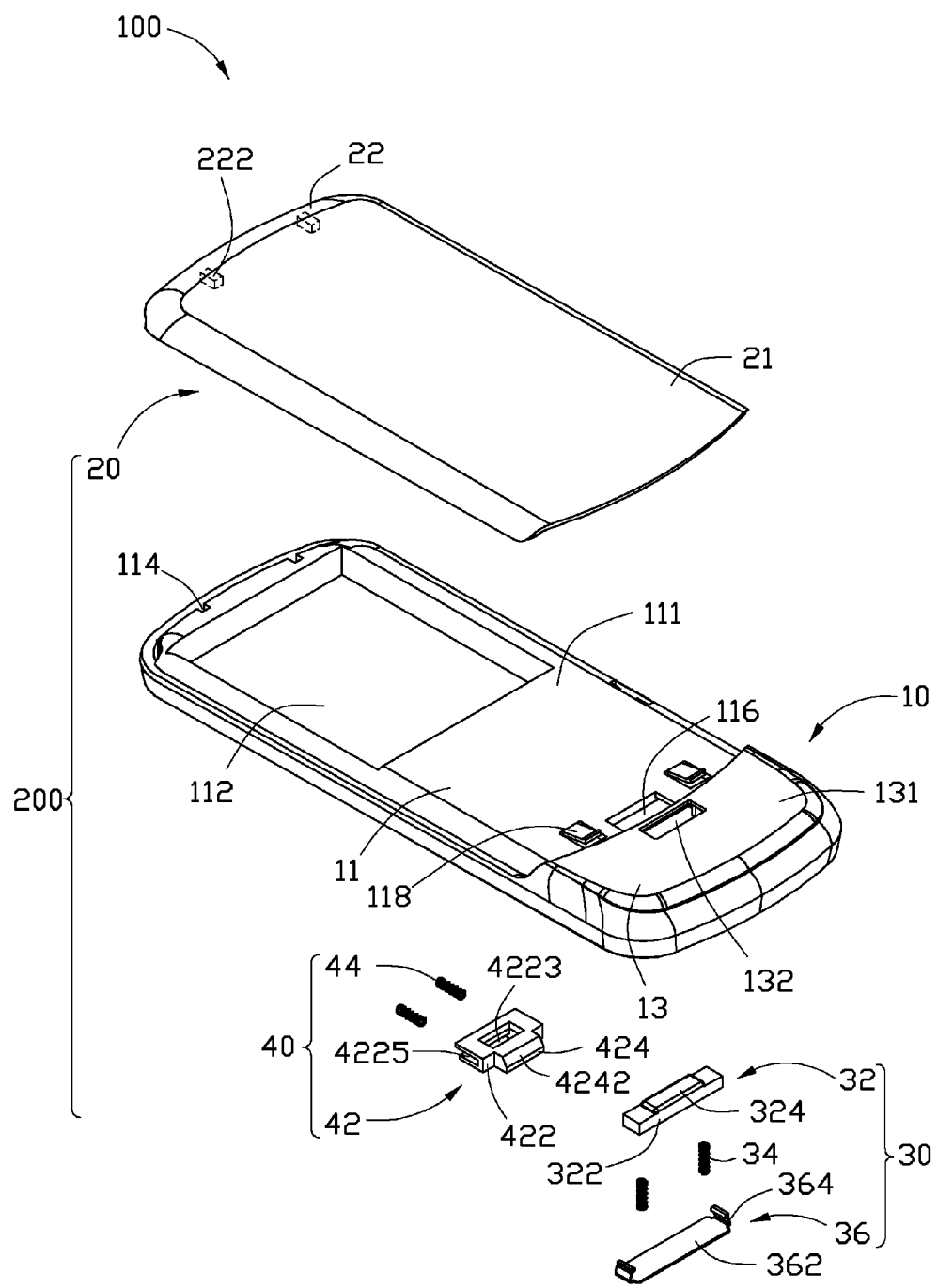
FIG. 1 is an exploded view of a portable electronic device having a latching mechanism as disclosed.

FIG. 1 shows a portable electronic device 100 such as a mobile phone according to an exemplary embodiment. The portable electronic device 100 includes a housing 10, a cover 20, a pressing assembly 30, and a latching assembly 40. The housing 10, the cover 20, the pressing assembly 30, and the latching assembly 40 cooperatively engage with each other as a latching mechanism 200 for latching the housing 10 to the cover 20.

The housing 10 has a latching section 11 and a base section 13 connected to the latching section 11. The latching section 11 can engage with the cover 20 and has an external surface 111 and an opposite internal surface 113. The latching section 111 defines a receiving compartment 112, two latching recesses 114, and a through latching hole 116 in the external surface 111. The receiving compartment 112 is configured to receive a battery (not shown). The two latching recesses 114 are located at the distal end of the latching section 11 away from the base section 13. In the present exemplary embodiment, the latching recesses 114 extend along a first direction, which may be a horizontal direction, to secure the cover 20 while in the second direction. In the present exemplary embodiment, the second direction is perpendicular to the first direction and is a vertical direction. The latching hole 116 is adjacent to the base section 13 and engages with the latching assembly 40. The latching section 11 further forms two tilted resilient strips 118 at the opposite sides of the latching hole 116 for resisting against the cover 20 when the cover 20 is assembled in the housing 10.

Figure 2:
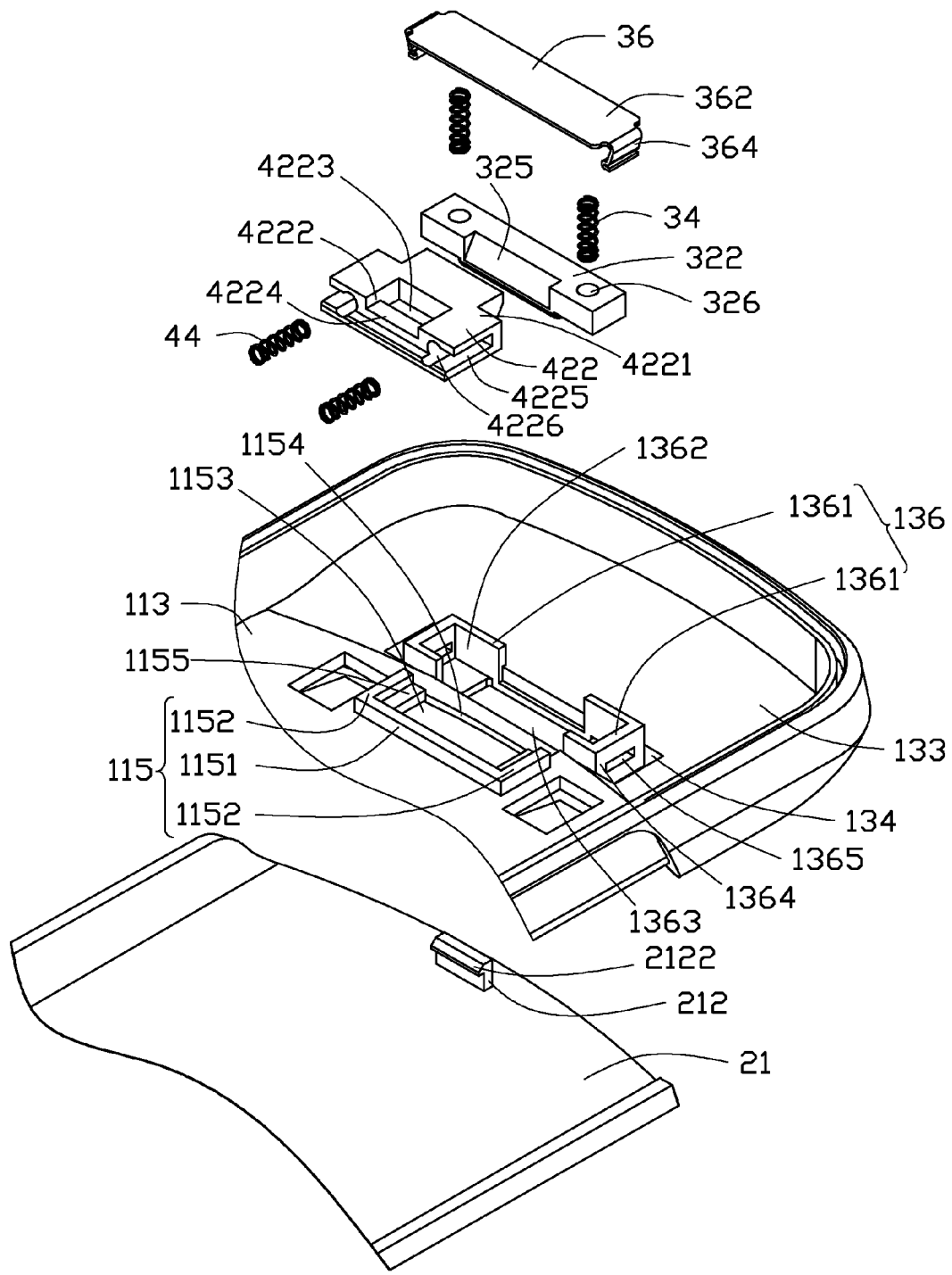
FIG. 2 is an exploded view of the latching mechanism shown in FIG. 1

Referring further to FIG. 2, the latching section 11 forms a cradle 115 in the internal surface 113 corresponding to the position of the latching hole 116. The cradle 115 has a stopper wall 1151 and two opposite sidewalls 1152, the stopper wall 1151 and the two sidewalls 1152 enclose a chamber 1153 communicating with the latching hole 116. The chamber 1153 can receive the latching assembly 40 and has an opening 1154 facing the base section 13. A rail 1155 laterally protrudes from the inter side of each sidewall 1152 for slidably engaging with the latching assembly 40.

The base section 13 defines an interlocking hole 132 in the external surface 131 adjacent to the latching section 11. The interlocking hole 132 engages with the pressing assembly 30. The base section 13 defines a recess 134 in the internal surface 133 corresponding to the position of the interlocking hole 132. The recess 134 is larger than and communicates with the interlocking hole 132. A frame 136 protrudes from the recess 134. The frame 136 includes two opposite peripheral walls 1361 enclosing the space 1362 communicating with the interlocking hole 132. The space 1362 has a gap 1363 facing the latching section 11. The gap 1363 aligns with and has substantially the same width as the opening 1154. A main section 1364 is included substantially parallel with the sidewall of the recess 134 of each peripheral wall 1361. The main section 1364 defines a clamp slot 1365 extending longitudinally along the sidewall of the recess 134. The clamp slots 1365 engage with the pressing assembly 30.

The cover 20 includes a main plate 21 and an end wall 22 connected to an end of the main plate 21. A hook 212 protrudes from the internal surface of the main plate 21. The hook 212 includes a catch 2122 extending laterally from the distal end of the hook 212. The catch 2122 is for latching the latching assembly 40. Two substantially parallel latching blocks 222 longitudinally protrude from the end wall 22 for engaging with the lathing recesses 114 of the housing 10.

The pressing assembly 30 includes a button 32, two first elastic members 34 and a locking leaf 36. The button 32 includes a main body 322 and a pressing portion 324 protruding from the top surface of the main body 322. The main body 322 is receivable in the space 1362 and defines a tilted notch 325. The tilted notch 325 extends from the bottom surface to a side surface. The main body 322 further defines two receiving holes 326 in the bottom surface. The notch 324 engages with the latching assembly 40. The two receiving holes 326 can partially receive the two first elastic members 34. The pressing portion 324 has a size corresponding to the interlocking hole 132 and can pass through the interlocking hole 132. The first elastic members 34 can be compression springs. The locking leaf 36 includes a plate portion 362 and two fixing portions 364 deformed at the two ends of the plate portion 362. The locking leaf 36 can be secured on the frame 136 with the plate portion 362 covering the frame 136 and each fixing portion 364 latches into the clamp slot 1365.

The latching assembly 40 includes a slider 42 and two second elastic members 44. The slider 42 includes a base portion 422 and an interlocking portion 424 protruding from an end of the base portion 422. The base portion 422 defines a cutout 4222 in the bottom surface 4221. The cutout 4222 defines a through hole 4223 at the bottom surface, and accordingly forms a hook wall 4224. The hook 212 of the cover 20 can pass through the through hole 4223 to hook on the hook wall 4224. A receiving groove 4226 and a guide groove 4225 are defined in the base portion 422 at each side thereof. The guide groove 4225 is substantially parallel to and interconnects with the receiving groove 4226. The guide groove 4225 slidably engages with the rail 1155 of the latching section 11. The receiving groove 4226 partially receives the second elastic member 44. The interlocking portion 424 has a slanted surface 4242 that engages the tilted notch 324 of the button 32.

Figure 3:
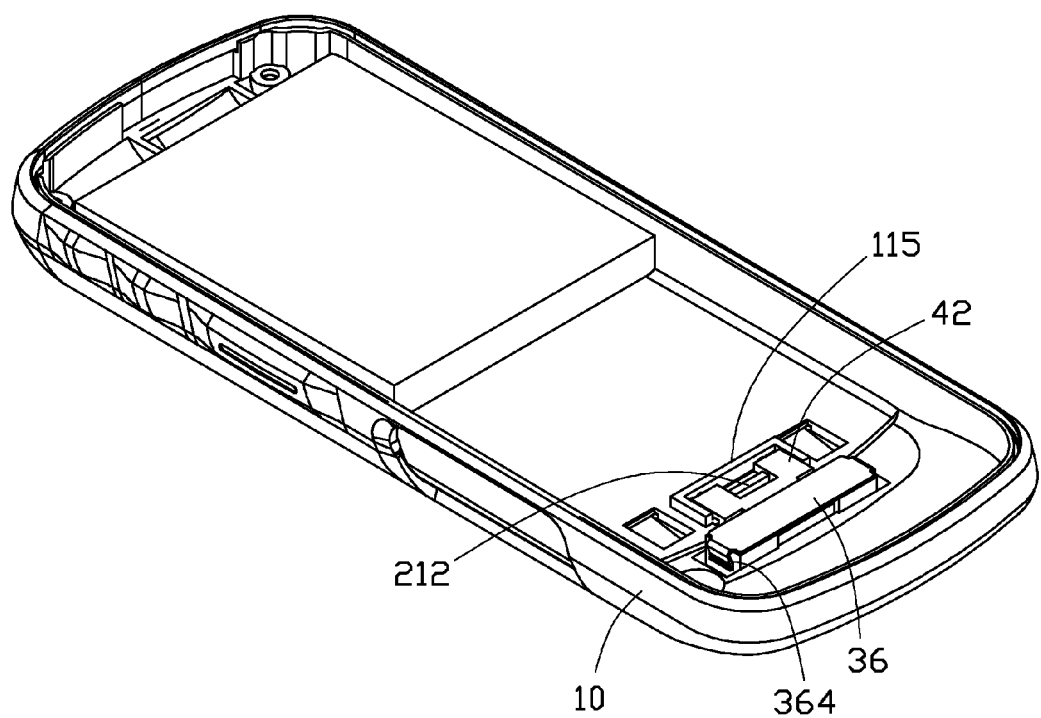
FIG. 3 is an assembled view of the latching mechanism shown in FIG. 1.

Referring further to FIG. 3, to assemble the latching mechanism 200, the latching assembly 40 is first assembled in the housing 10. The two second elastic members 44 are placed into the receiving groove 4226 of the slider 42 with each second elastic member 44 being partially exposed from the receiving groove 4226. The slider 42 is assembled, and the two guide grooves 4225 of the slider 42 slidably engage with the two rails 1155 of the housing 11. The through hole 4223 communicates with the latching hole 116, and the second elastic members 44 are compressed between the slider 42 and the stopper wall 1151 of the cradle 115. Then, the pressing assembly 30 is assembled in the housing 10. The button 32 is placed into the space 1362 of the frame 136, and the pressing portion 324 extends through the interlocking hole 132. The tilted notch 324 of the button 32 receives the interlocking portion 424 of the slider 42. Two first elastic members 34 are assembled into the two receiving holes 326 of the button 32 with each first elastic member 34 exposed relative to the receiving hole 326. After that, the locking leaf 36 is secured to the housing 10, and the two fixing portions 364 latch into the clamp slot 1365 of the frame 136. The two first elastic members 34 are compressed between the button 32 and the plate portion 362 of the locking leaf 36. At this time, the latching mechanism 200 is assembled, the button 32 can move downward along the second direction by pressing the pressing portion 324, the button 32 can then cause the slider 42 to slide along the first direction.

Figure 4:
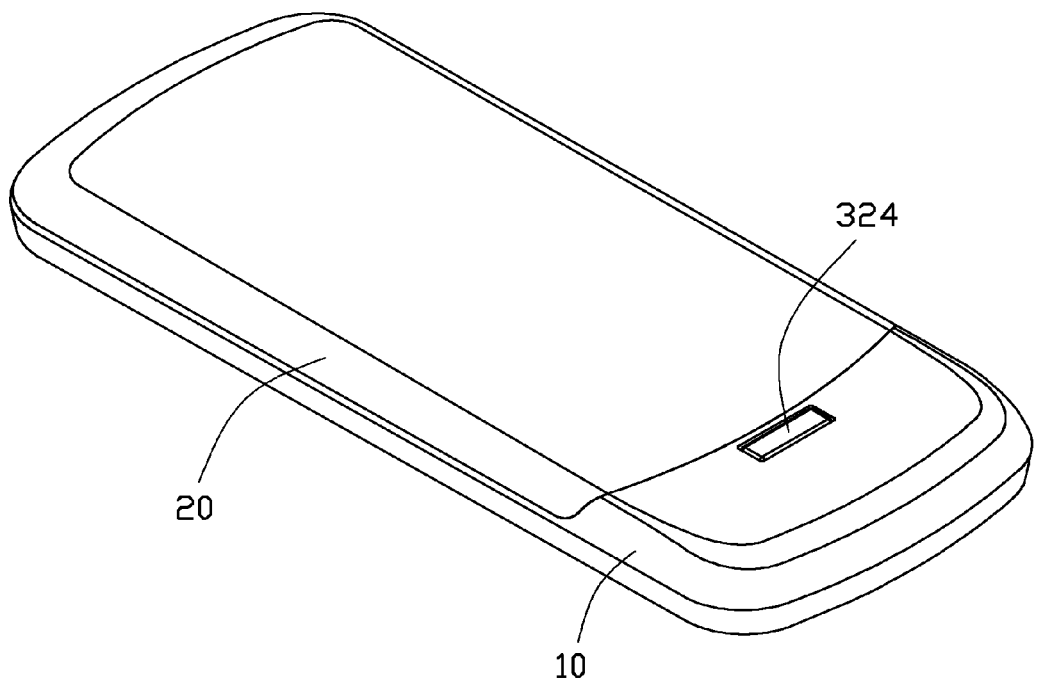
FIG. 4 is an assembled view of the portable electronic device shown in FIG. 1 from another angle.

Referring to FIG. 4, to latch the cover 20 on the housing 10, the button 32 is pressed downward, the slider 42 slides to compress the second elastic members 44. The cover 20 is attached to the housing 10 and the two latching blocks 222 latch into the two latching recesses 114. The hook 212 passes through the latching hole 116 of the latching section 11 and the through hole 4223 of the slider 42. The button 32 is released, and the two second elastic members 44 push the slider 42 to slide toward the frame 136, and the catch 2122 of the hook 212 hooks with the hook wall 4224 of the slider 42. Thus, the cover 20 is secured to the housing 10. The resilient clasps 118 resist upward against the cover 20.

Figure 5:
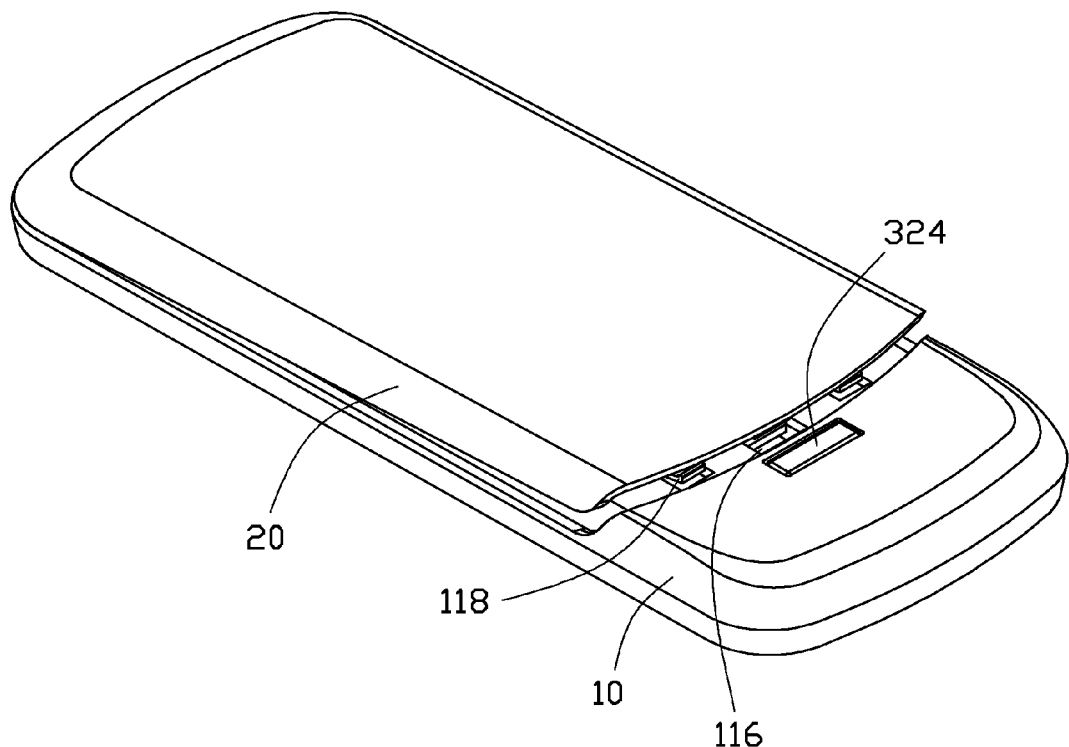
FIG. 5 is a schematic view of the portable electronic device shown in FIG. 4 in opened state.

Referring to FIG. 5, to detach the cover 20 from the housing 10, the button 32 is pressed downward, the slider 42 slides to make the catch 2122 unhook from the hook wall 4224. Then the end of the cover 20 can be released from the resilient clasps 118, and the cover 20 can be manually removed from the housing 10.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A latching mechanism for a portable electronic device, comprising:
   a housing including a base section and a latching section, the base section defining an interlocking hole, the latching section defining a latching hole;
   a pressing assembly including a button and at least one first elastic member, the button and the at least one first elastic member being assembled in the housing, the button aligning with the interlocking hole and for being pressed through the interlocking hole;
   a latching assembly including a slider and at least one second elastic member, the slider defining a through hole and forming a hook wall, the slider and the at least one second member being assembled in the housing, the through hole and the latching hole being in communication, and the slider being slidable along a first direction;
   a cover having a hook formed thereon;
   wherein when the button is pressed and moves along a second direction perpendicular with the first direction, and the at least one first elastic member is compressed, the button causes the slider to slide along the first direction, and the at least one second elastic member is compressed, the hook passes through the latching hole and the through hole, and after the button is released, the at least one second elastic member extends and pushes the slider to return along the first direction, for latching the hook wall of the slider with the hook of the cover.

2. The latching mechanism as claimed in claim 1, wherein the latching section defines two latching recesses at an external surface to respectively latch with two latching blocks of the cover.

3. The latching mechanism as claimed in claim 1, wherein the latching section forms two tilted resilient strips for upwardly resisting an end of the cover when the cover is assembled on the housing.

4. The latching mechanism as claimed in claim 1, wherein the latching section forms a cradle in the internal surface, corresponding to the position of the latching hole, the cradle has a chamber communicating with the latching hole for slidably receiving the slider.

5. The latching mechanism as claimed in claim 4, wherein the cradle forms a rail at each sidewall, the slider defines corresponding guiding grooves to engage with the rails.

6. The latching mechanism as claimed in claim 4, wherein the base section forms a frame on the internal surface, surrounding and larger than the interlocking hole, the frame has a space communicating with the interlocking hole to receive the button.

7. The latching mechanism as claimed in claim 6, wherein the chamber has an opening facing the base section, the space has a gap facing the latching section, the gap aligns with and has the same width as the opening.

8. The latching mechanism as claimed in claim 6, wherein the frame includes opposite peripheral walls, each peripheral wall defines a clamp slot, the pressing assembly includes a locking leaf, the locking leaf has a fixing portion at each end, the locking leaf is secured to the frame by latching of the fixing portions into the clamp slots.

9. The latching mechanism as claimed in claim 1, wherein the cover includes a main plate, the hook protrudes from the internal surface of the main plate, the hook includes a catch laterally extending at the distal end for latching with the hook wall.

10. The latching mechanism as claimed in claim 8, wherein the button includes a main body and a pressing portion protruding from the main body, the main body is receivable in the space and the pressing portion engages into the interlocking hole.

11. The latching mechanism as claimed in claim 10, wherein the main body defines a tilted notch, the slider forms an interlocking portion having a slanted surface to interlock into the notch.

12. The latching mechanism as claimed in claim 10, wherein the main body defines at least one receiving hole facing the locking leaf to receive an end of the at least one elastic member.

13. The latching mechanism as claimed in claim 11, wherein the slider includes a base portion having the interlocking portion protruding from an end of the base portion, the base portion defines a cutout, the through hole is defined at the bottom of the cutout and accordingly to form the hook wall.

14. A portable electronic device, comprising:
 a housing including a base section and a latching section, the base section defining an interlocking hole, the latching section defining a latching hole;
 a pressing assembly including a button and at least one first elastic member, the button and the at least one first elastic member all being assembled in the housing, the button aligning with the interlocking hole for being pressed through the interlocking hole;
 a latching assembly including a slider and at least one second elastic member, the slider defining a through hole, the slider and the at least one second member all being assembled in the housing, the through hole communicating with the latching hole and the slider being slidable along a first direction;
 a cover having a hook formed thereon;
 wherein when the button is pressed and move along a second direction perpendicular with the first direction, and the at least one first elastic member is compressed, the button causes the slider to slide along the first direction, and the at least one second elastic member is compressed, the hook passes through the latching hole and the through hole, after the button is released, the at least one second elastic member extends and pushes the slider to return along the first direction for latching the hook of the cover with the housing.

15. The portable electronic device as claimed in claim 14, wherein the latching section defines two latching recesses at an external surface to latch with two latching blocks of the cover.

16. The portable electronic device as claimed in claim 14, wherein the latching section forms two tilted resilient strips upwardly resisting an end of the cover when the cover is assembled.

* * * * *